(12) United States Patent
Cheng et al.

(10) Patent No.: US 11,997,597 B2
(45) Date of Patent: *May 28, 2024

(54) METHOD OF MONITORING PHYSICAL DOWNLINK CONTROL CHANNEL FOR POWER SAVING SIGNAL AND RELATED DEVICE

(71) Applicant: Hannibal IP LLC, Frisco, TX (US)

(72) Inventors: Yu-Hsin Cheng, Taipei (TW); Hsin-Hsi Tsai, Taipei (TW); Chia-Hao Yu, Taipei (TW); Chie-Ming Chou, Taiepei (TW)

(73) Assignee: Hannibal IP LLC, Frisco, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/136,449

(22) Filed: Apr. 19, 2023

(65) Prior Publication Data

US 2023/0413174 A1    Dec. 21, 2023

Related U.S. Application Data

(63) Continuation of application No. 16/991,015, filed on Aug. 11, 2020, now Pat. No. 11,665,639.
(Continued)

(51) Int. Cl.
*H04W 52/02* (2009.01)
*H04W 72/21* (2023.01)
*H04W 72/51* (2023.01)

(52) U.S. Cl.
CPC ....... *H04W 52/0216* (2013.01); *H04W 72/21* (2023.01); *H04W 72/51* (2023.01)

(58) Field of Classification Search
None
See application file for complete search history.

(56) References Cited

U.S. PATENT DOCUMENTS 9,872,252 B1    1/2018  Ang
9,949,164 B2 *  4/2018  Heo ................ H04W 52/0235
(Continued)

FOREIGN PATENT DOCUMENTS

CN    109952789    6/2019
CN    114258732    3/2022
(Continued)

OTHER PUBLICATIONS

Final Office Action dated Nov. 18, 2022 for corresponding U.S. Appl. No. 16/991,015.
(Continued)

*Primary Examiner* — Hassan A Phillips
*Assistant Examiner* — Gautam Sharma
(74) *Attorney, Agent, or Firm* — Marcella M. Bodner; Cole Schotz, P.C.

(57) ABSTRACT

A method for a user equipment (UE) monitoring a physical downlink control channel (PDCCH) for power saving signaling is disclosed. The method comprises receiving a discontinuous reception (DRX) configuration from a base station (BS) to configure the UE to monitor a scheduling signal on the PDCCH within a DRX active time, and receiving a configuration from the BS to configure the UE to monitor the power saving signaling on the PDCCH and instructing the UE to wake up for monitoring the scheduling signal in the DRX active time, wherein the configuration includes a time in milliseconds prior to a start of a DRX on-duration time, and instructs the UE to start monitoring the PDCCH for the power saving signaling.

14 Claims, 7 Drawing Sheets

Related U.S. Application Data

(60) Provisional application No. 62/886,797, filed on Aug. 14, 2019.

(56) References Cited

U.S. PATENT DOCUMENTS

| | | | |
|---|---|---|---|
| 11,665,639 | B2 | 5/2023 | Cheng |
| 2011/0205928 | A1 | 8/2011 | Pelletier |
| 2014/0119310 | A1 | 5/2014 | Shimizu |
| 2016/0113059 | A1 | 4/2016 | Vannithamby et al. |
| 2018/0007734 | A1 | 1/2018 | Kela |
| 2019/0223162 | A1* | 7/2019 | Suzuki ............... H04W 72/042 |
| 2019/0239189 | A1 | 8/2019 | Hwang |
| 2020/0037247 | A1 | 1/2020 | Liao |
| 2020/0037396 | A1* | 1/2020 | Islam .................... H04W 88/06 |
| 2020/0120606 | A1 | 4/2020 | Beale |
| 2020/0229092 | A1 | 7/2020 | Wu |
| 2020/0229093 | A1* | 7/2020 | Ahmad ............... H04W 72/042 |
| 2020/0245303 | A1 | 7/2020 | Hwang |
| 2020/0267670 | A1 | 8/2020 | Astrom |
| 2020/0280959 | A1 | 9/2020 | Sharma |
| 2020/0314756 | A1 | 10/2020 | Xu |
| 2020/0351786 | A1 | 11/2020 | Koskela |
| 2020/0359314 | A1 | 11/2020 | Wu |
| 2021/0051698 | A1 | 2/2021 | Tsai |
| 2022/0078650 | A1 | 3/2022 | Lee |

FOREIGN PATENT DOCUMENTS

| | | |
|---|---|---|
| EP | 4014689 | 6/2022 |
| IN | 202247005223 | 3/2022 |
| WO | 2018204799 | 11/2018 |
| WO | 2018208956 | 11/2018 |
| WO | 2019032009 | 2/2019 |
| WO | 2019055418 | 3/2019 |
| WO | 2019059657 | 3/2019 |
| WO | 2021027640 | 1/2021 |

OTHER PUBLICATIONS

Non-Final Office Action dated Mar. 18, 2022 for corresponding U.S. Appl. No. 16/991,015.
Notice of Allowance dated Feb. 28, 2023 for corresponding U.S. Appl. No. 16/991,015.
Issue Notification dated May 10, 2023 for U.S. Appl. No. 16/991,015.
Extended European Search Report dated Aug. 11, 2023 for European Patent Application No. 20852089.
International Preliminary Report on Patentability dated Feb. 8, 2022 for International Patent Application No. PCT/CN2020/106888.
International Search Report dated Oct. 28, 2020 for International Patent Application No. PCT/CN2020/106888.
OPPO R2-1905603, 3GP TSG-RAN WG2 Meeting #106 Impacts of PDCCH-based wake up signaling. May 17, 2019.
VIVO R2-1905955, 3 GPP TSG-RAN WG2 Meeting #106 WUS Co-operation with C-DRX, May 17, 2019 (May 17, 2019).
Written Opinion of the International Searching Authority dated Oct. 28, 2020 for International Patent Application No. PCT/CN2020/106888.
Search Report issued by the State Intellectual Property Office of the Peoples Republic of China dated Nov. 29, 2023, for corresponding Chinese Patent Application No. 202080056608.
First Office Action issued by the State Intellectual Property Office of the Peoples Republic of China dated Nov. 29, 2023 for corresponding Chinese Patent Application No. 202080056608.
Final Examination Report dated Jun. 15, 2023 by the Indian Patent Office for corresponding Indian Patent No. 202247005223.

* cited by examiner

METHOD OF MONITORING PHYSICAL DOWNLINK CONTROL CHANNEL FOR POWER SAVING SIGNAL AND RELATED DEVICE

CROSS-REFERENCE TO RELATED APPLICATION(S)

The present application is a continuation of U.S. patent application Ser. No. 16/991,015, filed on Aug. 11, 2020, now allowed, which claims the benefit of and priority to U.S. provisional Patent Application Ser. No. 62/886,797 filed on Aug. 14, 2019, entitled "Mechanism for determining offset of power saving signaling," (hereinafter referred to as "the '797 provisional"). The disclosure of the '797 provisional is hereby incorporated fully by reference into the present disclosure.

FIELD

The present disclosure generally relates to wireless communications, and more particularly, to a method of monitoring a physical downlink (DL) control channel (PDCCH) for a power saving signaling and a related device.

BACKGROUND

3GPP provides a new study item on a user equipment (UE) power saving in new radio (NR). A power saving signaling is used for triggering UE adaptation to discontinuous reception (DRX) operation, to reduce PDCCH monitoring occasion. The UE power consumption may be decreased if the number of PDCCH monitoring occasions is reduced.

The power saving signaling is configured outside DRX active time, and is configured to the UE by a new downlink control information (DCI) format. The power saving signaling is also denoted as a wake-up signal (WUS), which instructs the UE to wake up/monitor the PDCCH in the DRX active time and/or instructs the UE to wake up/monitor the PDCCH in the on-duration time of the following DRX cycle. The DRX active time of the UE may include the time while:
1. drx-onDurationTimer, drx-InactivityTimer, drx-RetransmissionTimerDL, drx-RetransmissionTimerUL, ra-ContentionResolutionTimer, or ra-ResponseWindow is running; or
2. a Scheduling Request is sent on physical uplink control channel (PUCCH) and is pending; or
3. a PDCCH indicating a new transmission addressed to the Cell Radio Network Temporary Identifier (C-RNTI) of the Medium Access Control (MAC) entity has not been received after successful reception of a Random Access Response (RAR) for the Random Access Preamble not selected by the MAC entity among the contention-based Random Access Preambles.

The power saving signaling is only configured when DRX is configured. The UE may be configured with control resource set (CORESET) and search space (SS) set (e.g., common search space (CSS) or UE-specific search space (USS)) to monitor DCI format for the power saving signaling. Based on the current framework, the DCI format may be associated with the SS set. The UE may monitor the DCI format for the power saving signaling according to the configured parameters for the associated SS set. However, there is no specification for the power saving signaling configuration, and thus the UE may not know when to monitor the PDCCH for the power saving signaling.

SUMMARY

The present disclosure is directed to a method of monitoring physical downlink control channel (PDCCH) for a power saving signaling and a related device.

According to an aspect of the present disclosure a method for a user equipment (UE) monitoring a physical downlink control channel (PDCCH) for power saving signaling is disclosed. The method comprises receiving a discontinuous reception (DRX) configuration from a base station (BS) to configure the UE to monitor a scheduling signal on the PDCCH within a DRX active time, and receiving a configuration from the BS to configure the UE to monitor the power saving signaling on the PDCCH and instructing the UE to wake up for monitoring the scheduling signal in the DRX active time, wherein the configuration includes a time in milliseconds prior to a start of a DRX on-duration time, and instructs the UE to start monitoring the PDCCH for the power saving signaling.

According to another aspect of the present disclosure, a UE for monitoring a PDCCH for a power saving signaling is disclosed. The UE comprises a processor, for executing computer-executable instructions, and a non-transitory machine-readable medium, coupled to the processor, for storing the computer-executable instructions, wherein the computer-executable instructions instruct the processor to receive a discontinuous reception (DRX) configuration from a base station (BS) to configure the UE to monitor a scheduling signal on the PDCCH within a DRX active time, and receive a configuration from the BS to configure the UE to monitor the power saving signaling on the PDCCH and instructing the UE to wake up for monitoring the scheduling signal in the DRX active time, wherein the configuration includes a time in milliseconds prior to a start of a DRX on-duration time, and instructs the UE to start monitoring the PDCCH for the power saving signaling.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

DETAILED DESCRIPTION

Figure 1:
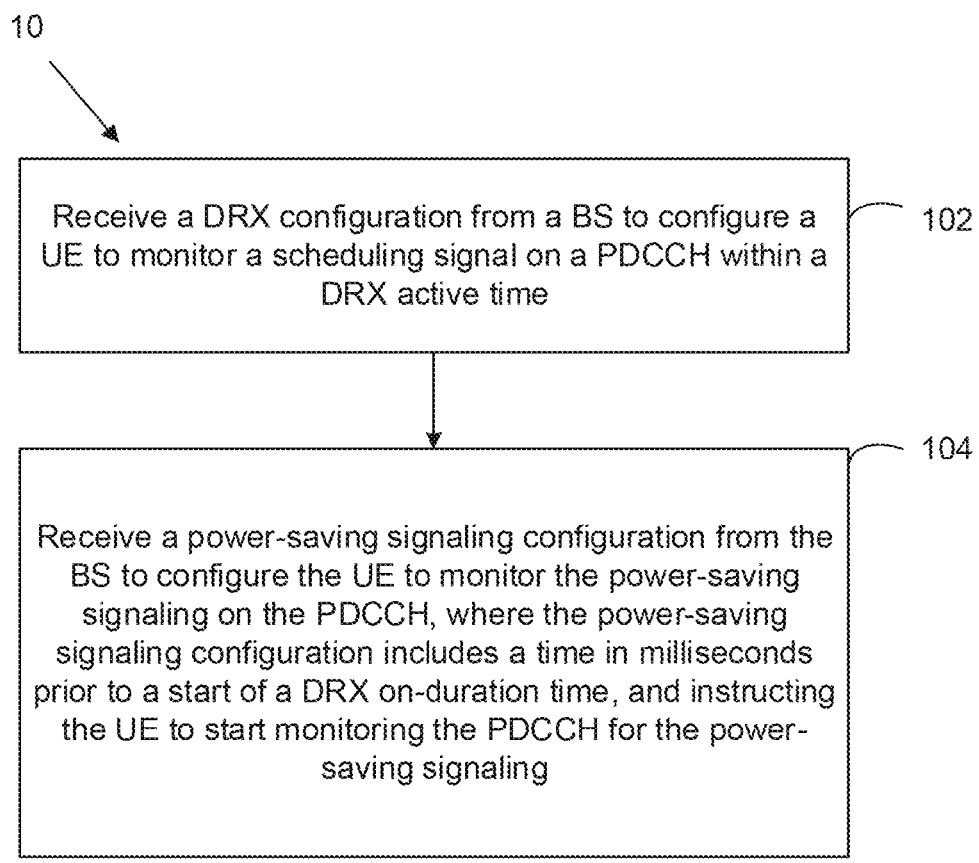
FIG. 1 is a flowchart illustrating a physical sidelink feedback control channel (PSFCH) resource determination, in accordance with example implementations of the present disclosure.

The following description contains specific information pertaining to exemplary implementations in the present disclosure. The drawings and their accompanying detailed description are directed to exemplary implementations. However, the present disclosure is not limited to these exemplary implementations. Other variations and implementations of the present disclosure will occur to those skilled in the art. Unless noted otherwise, like or corresponding elements in the figures may be indicated by like or corresponding reference numerals. Moreover, the drawings and illustrations are generally not to scale and are not intended to correspond to actual relative dimensions.

For consistency and ease of understanding, like features are identified (although, in some examples, not shown) by numerals in the exemplary figures. However, the features in different implementations may be different in other respects, and therefore will not be narrowly confined to what is shown in the figures.

The phrases "in one implementation," and "in some implementations," may each refer to one or more of the same or different implementations. The term "coupled" is defined as connected, whether directly or indirectly via intervening components, and is not necessarily limited to physical connections. The term "comprising" means "including, but not necessarily limited to" and specifically indicates open-ended inclusion or membership in the described combination, group, series, and equivalents.

Additionally, any two or more of the following paragraphs, (sub)-bullets, points, actions, behaviors, terms, alternatives, examples, or claims described in the following disclosure may be combined logically, reasonably, and properly to form a specific method. Any sentence, paragraph, (sub)-bullet, point, action, behaviors, terms, or claims described in the following disclosure may be implemented independently and separately to form a specific method. Dependency, e.g., "according to", "more specifically", "preferably", "In one embodiment", "In one implementation", "In one alternative" etc., in the following disclosure refers to just one possible example which would not restrict the specific method.

For explanation and non-limitation, specific details, such as functional entities, techniques, protocols, and standards are set forth for providing an understanding of the described technology. In other examples, detailed description of well-known methods, technologies, system, and architectures are omitted so as not to obscure the description with unnecessary details.

Persons skilled in the art will recognize that any described network function(s) or algorithm(s) may be implemented by hardware, software, or a combination of software and hardware. Described functions may correspond to modules that are software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of applications specific integrated circuitry (ASIC), programmable logic arrays, and/or using one or more digital signal processor (DSPs). Although some of the disclosed implementations are directed to software installed and executing on computer hardware, alternative implementations as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc (CD) read-only memory (CD ROM), magnetic cassettes, magnetic tape, magnetic disk storage, or any other equivalent medium capable of storing computer-readable instructions.

A radio communication network architecture (e.g., a long term evolution (LTE) system, an LTE-Advanced (LTE-A) system, an LTE-A Pro system, or an New Radio (NR) system typically includes at least one base station (BS), at least one UE, and one or more optional network elements that provide a connection with a network. The UE communicates with the network (e.g., a core network (CN), an evolved packet core (EPC) network, an Evolved Universal Terrestrial Radio Access Network (RAN) (E-UTRAN), a Next-Generation (GN) Core (NGC), 5G CN (5GC), or an internet via a RAN established by the BS.

In the present disclosure, a UE may include, but is not limited to, a mobile station, a mobile terminal or device, a user communication radio terminal. For example, a UE may be a portable radio equipment, that includes, but is not limited to, a mobile phone, a tablet, a wearable device, a sensor, or a personal digital assistant (PDA) with wireless communication capability. The UE is configured to receive and transmit signals over an air interface to one or more cells in a RAN.

A BS may include, but is not limited to, a node B (NB) as in the UMTS, an evolved node B (eNB) as in the LTE-A, a radio network controller (RNC) as in the UMTS, a BS controller (BSC) as in the Global System for Mobile communications (GSM)/GSM Enhanced Data rates for GSM Evolution (EDGE) RAN (GERAN), an Next Generation (NG)-eNB as in an Evolved Universal Terrestrial Radio Access (E-UTRA) BS in connection with the 5GC, a next generation node B (gNB) as in the 5G-RAN, and any other apparatus capable of controlling radio communication and managing radio resources within a cell. The BS may connect to serve the one or more UEs via a radio interface to the network.

A BS may be configured to provide communication services according to at least one of the following radio access technologies (RATs): Worldwide Interoperability for Microwave Access (WiMAX), GSM (often referred to as 2G), GERAN, General Packet Radio Service (GRPS), UMTS (often referred to as 3G) according to basic wideband-code division multiple access (W-CDMA), high-speed packet access (HSPA), LTE, LTE-A, evolved LTE (eLTE), New Radio (NR, often referred to as 5G), and/or LTE-A Pro. However, the scope of the present disclosure should not be limited to these protocols.

The BS is operable to provide radio coverage to a specific geographical area using a plurality of cells forming the RAN. The BS supports the operations of the cells. Each cell is operable to provide services to at least one UE within radio coverage of the cell. More specifically, each cell (often referred to as a serving cell) provides services to serve one or more UEs within the cell's radio coverage, (e.g., each cell schedules the downlink (DL) and optionally uplink (UL)

resources to at least one UE within the cell's radio coverage for DL and optionally UL packet transmissions). The BS can communicate with one or more UEs in the radio communication system via the plurality of cells. A cell may allocate sidelink (SL) resources for supporting proximity service (ProSe), LTE SL service, and LTE/NR V2X services. Each cell may have overlapped coverage areas with other cells.

FIG. 1 illustrates a method 100 for a UE to monitor a PDCCH for a power saving signaling. In action 102, the UE receives a DRX configuration from a BS to configure the UE to monitor a scheduling signal on a PDCCH within a DRX active time. In action 104, the UE receives a power saving signaling configuration from the BS to configure the UE to monitor the power saving signaling on the PDCCH (e.g., DCI format 2_6), wherein the power saving signaling configuration includes a time in milliseconds prior to a start of a DRX on-duration time, and instructs the UE to start monitoring the PDCCH for the power saving signaling (or called power saving signaling monitoring occasion). In addition, the power saving signaling configuration may include periodicity and duration for the power saving signaling monitoring occasion.

The method 100 achieves monitoring of the PDCCH for the power saving signaling according to an offset of the power saving signaling configuration (or called power saving signal offset). The power saving signaling monitoring occasion is located prior to the DRX on-duration time according to the offset (e.g., time in milliseconds). Thus, the UE starts to monitor the PDCCH for the power saving signaling at a known offset before DRX on-duration time.

Moreover, the UE may report a UE capability to the BS, which instructs the required time for UE to wake up after receiving power saving signaling when the UE is in sleep state, when the UE is in DRX off-duration time, or when the UE is outside DRX active time. The numerology of required time may be a symbol, slot, subframe or absolute time unit (e.g., ns, us, ms, etc.). Thus, the BS may determine the power saving signaling configuration according to the required time of the UE capability.

Figure 2A:
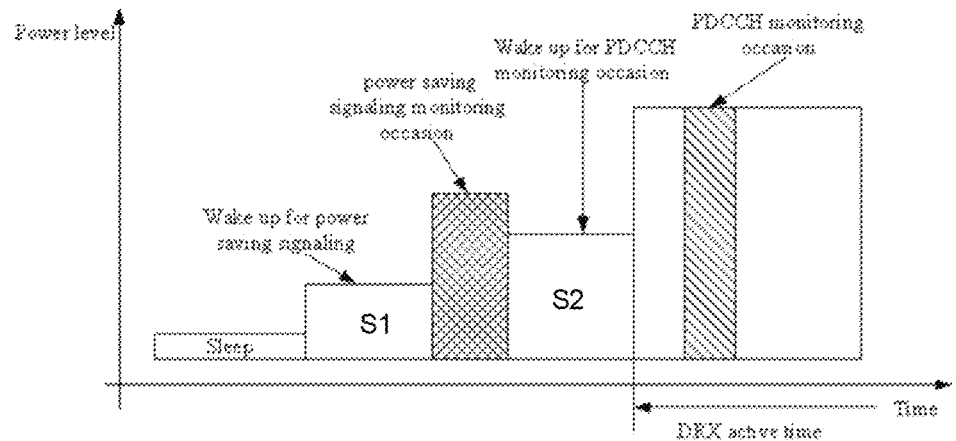
FIG. 2A and FIG. 2B are schematic diagrams illustrating PDCCH monitoring, in accordance with example implementations of the present disclosure.
Figure 2B:
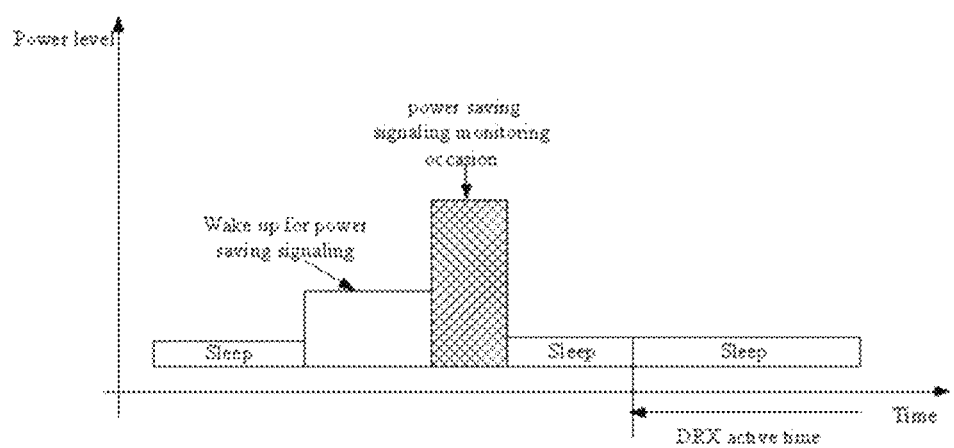

The present disclosure provides solutions to address the issue about how the UE determines the power saving signaling monitoring occasion and resource location of the power saving signaling. With reference to FIG. 2A, at the power saving signaling monitoring occasion outside the DRX active time, the UE enters the first wake-up stage S1 for monitoring the PDCCH (with a power level higher than the sleep state of the UE). At the first wake-up stage S1, the UE's capability may be strictly limited for saving power. For example, the UE does not expect to receive the same slot scheduling grant for a Physical Downlink Shared Channel (PDSCH). Therefore, in the first wake-up stage S1 (e.g., waking up for monitoring power saving signaling from sleep state as shown in FIG. 2A), a lower power implementation can be achieved by optimizing, at least: (i) a PDCCH processing timeline, (ii) the amount of hardware needed to be waken/involved, (iii) a voltage/clock operating point of hardware, and potentially (iv) a receiving (RX) bandwidth and the number of antennas. Only when the power saving signaling is decoded, the UE transitions to the second wake-up stage S2, and thus wakes up additional hardware and processing units (e.g., bandwidth part (BWP)/component carrier switching, channel state information reference signal (CSI-RS processing), etc.), to prepare for DL/UL data scheduling. The UE in the second wake-up stage S2 consumes additional power but may skip a few subsequent DRX cycles if the UE does not receive power saving signaling outside the DRX active time and/or the power saving signaling instructs the UE to keep sleeping in DRX active time/DRX on-duration time as shown in FIG. 2B and/or there are no other events requiring the UE to monitor the PDCCH. Thus, the PDCCH monitoring occasion is reduced (e.g., the UE stays in sleep state at a low power level), which decreases power consumption of the UE.

It is noted that the offset from the starting symbol of the DRX active time/DRX on-duration time to power saving signaling is explicitly indicated. For example, a time in milliseconds prior to the starting symbol of the DRX on-duration time is configured in the power saving signaling configuration.

Figure 3A:
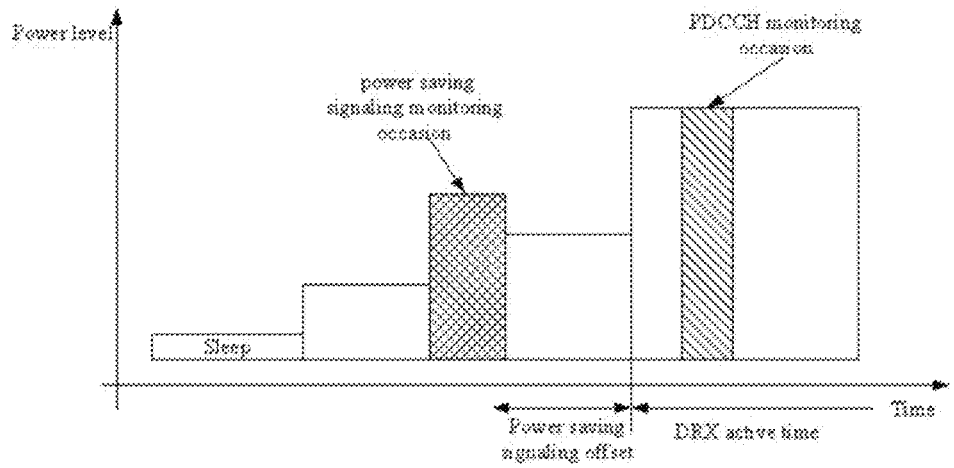
FIG. 3A and FIG. 3B are schematic diagrams illustrating power saving signaling configuration, in accordance with example implementations of the present disclosure.
Figure 3B:
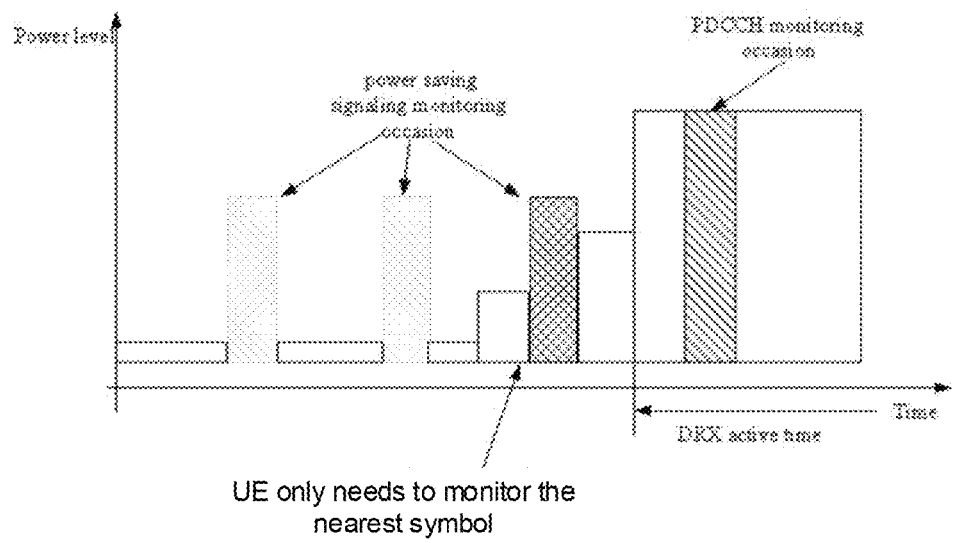

A new radio resource control (RRC) information element (IE) may be used for the power saving signaling configuration, which instructs the offset. If there is an explicit offset in the power saving signaling configuration, the UE may monitor the power saving signaling before the offset from every DRX active time/DRX on-duration time as shown in FIG. 3A. However, if there is no explicit offset in the power saving signaling configuration, the UE may monitor the power saving signaling according to a pre-defined method. For example, the UE may consider the DL symbol located on the nearest symbol to the starting symbol of upcoming DRX active time/DRX on-duration time as the power saving signaling monitoring occasion as shown in FIG. 3B. It is noted that in one implementation, the DL symbol may be the DL symbol configured by TDD-UL-DL-ConfigurationCommon or TDD-UL-DL-dedicated. In some implementations, the DL symbol may be the DL symbol indicated by DCI format 2_0. In some implementations, the last symbol for the power saving signaling monitoring occasion is the DL symbol located on the nearest symbol to the start of upcoming DRX active time/DRX on-duration time. For other implementations, the UE may consider the DL symbol located on the nearest DL symbol to the offset from every DRX active time/DRX on-duration time. It is noted that in frequency division duplex (FDD) operation, the nearest symbol for the power saving signaling locates on the starting symbol of the DRX active time/DRX on-duration time. If the periodicity of the power saving signaling configuration is different from DRX cycle, the UE may not monitor the power saving signaling whose periodicity interval between the power saving signaling and the DRX cycle is smaller than the offset from the starting symbol of the DRX active time/DRX on-duration time.

On the other hand, the offset may be configured via a new IE in the RRC configuration with different numerologies. Various RRC configurations are disclosed.

1. A new IE in the RRC configuration instructs the number of symbols for the offset between the starting symbol of the DRX active time/on-duration time and the starting symbol of power saving signaling. In an example, only DL symbols are counted for determining the offset. In other examples, DL and/or UL and/or Flexible (FL) symbols are counted for determining the offset.

2. A new IE in the RRC configuration instructs the number of slots/subframes for the offset between the starting slot/subframe of the DRX active time/DRX on-duration time and the starting slot/subframe of power saving signaling. It is noted that DRX active time is the legacy DRX active time defined in NR Rel-15 technical standard. It is further noted that DRX on-duration time is a time duration when the DRX-onDurationTimer is running. It is also noted that the symbol location of power saving signaling within the slot/subframe may be according to a pre-defined method. For example, the UE may monitor the power saving signaling only on some specific symbols (e.g., the first and the second symbols of the slot). In some implementations, the pre-defined method may be a rule to find a suitable symbol for the power saving signaling. For example, power saving signaling monitoring occasion may be located on the symbol which is the nearest "DL" or "DL or FL" symbol to the starting symbol of the DRX active time/DRX on-duration time.

3. A new IE in the RRC configuration instructs the number of symbols for the offset between the starting symbol of the DRX on-duration time and the starting symbol of power saving signaling. It is noted that the UE may assume the periodicity of power saving signaling is the same as DRX cycle (e.g., either short DRX cycle or long DRX cycle).

4. A new IE in the RRC configuration instructs the number of slots/subframes for the offset between the starting slot/subframe of the DRX on-duration time and the starting slot/subframe of power saving signaling. It is also noted that the symbol location of power saving signaling within the slot/subframe may be according to a pre-defined method In one implementation, the pre-defined method may include the UE monitoring the power saving signaling only on some specific symbols (e.g., the first and the second symbols of the slot). In some implementations, the pre-defined method may be a rule to find a suitable symbol for the power saving signaling. For example, the power saving signaling monitoring occasion may be located on a symbol which is the nearest "DL" or "DL or FL" symbol to the starting symbol of the DRX on-duration time.

Figure 4A:
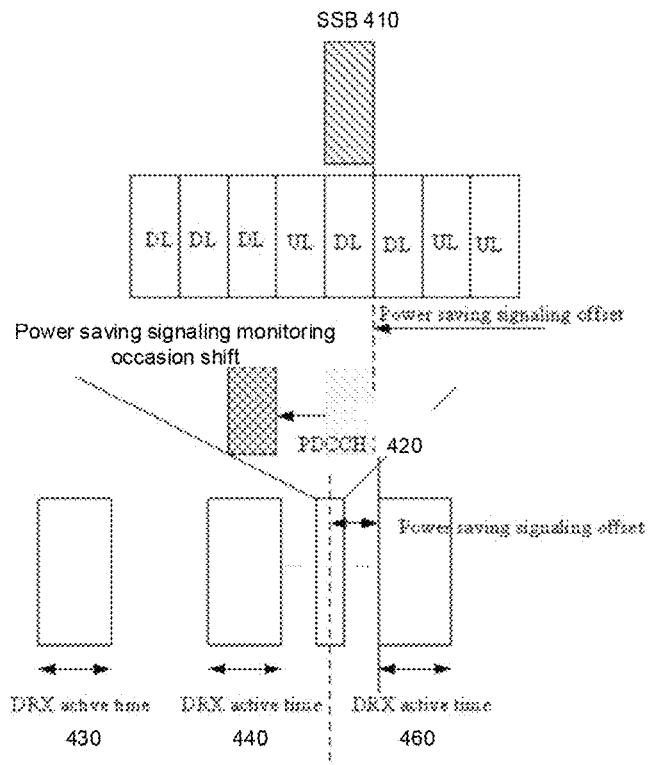
FIG. 4A and FIG. 4B are schematic diagrams illustrating shift of a PDCCH monitoring occasion, in accordance with example implementations of the present disclosure.

In one implementation, the UE may autonomously shift the occasion for monitoring the PDCCH for the power saving signaling, specifically the power saving signaling monitoring occasion. As shown in FIG. 4A, the UE may be configured to monitor the power saving signaling on PDCCH 420 according to the power saving signal offset. However, the UE may not be required to monitor the power saving signaling on the symbols overlaps PDCCH 420. For example, synchronization signal block (SSB) 410 is transmitted on a DL symbol of a slot that overlaps the PDCCH 420, and thus UE is configured to monitor SSB 410. In this case, the UE may have no monitoring occasion for the power saving signaling before the upcoming DRX active time/DRX on-duration time 460. Hence, the UE will shift a monitoring occasion for the power saving signaling.

Figure 4B:
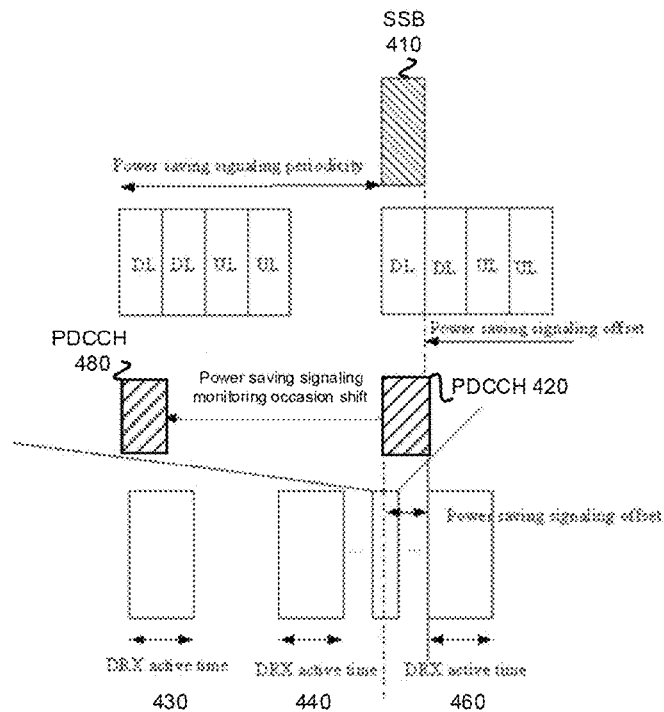

In another implementation, as shown in FIG. 4B, the UE may be configured to monitor the power saving signaling on one or more monitoring occasions before DRX active time/DRX on-duration time (e.g., PDCCH 480 and PDCCH 420). However, the UE may not be required to monitor the power saving signaling on the symbol which is the nearest symbol of the slot to DRX active time/DRX on-duration time (e.g., PDCCH 420) according to the power saving signal offset, but monitor the farthest symbol of the slot for the power saving signaling (e.g., PDCCH 480). In other cases, the UE may not be required to monitor the power saving signaling on the symbol which is the farthest of the slot from the DRX active time/DRX on-duration time (e.g., PDCCH 480). For example, the SSB 410 is transmitted on a DL symbol of a slot that overlaps the PDCCH 420 for the power saving signaling monitoring occasion, and thus the UE is configured to monitor SSB 410. Therefore, the UE may need a rule to determine a new monitoring occasion for the power saving signaling.

Examples for autonomously shifting the power saving signaling monitoring occasion are disclosed.

1. When the UE is not required to monitor the power saving signaling in a symbol/slot/subframe, the UE may autonomously shift the monitoring occasion for the power saving signaling from the original location to the nearest DL/(DL or FL) symbol. It is noted that the nearest DL/(DL or FL) symbol from the original location of power saving signaling may be located in the same slot or different slots. It is noted that if UE may iteratively determine resource allocation for the power saving signaling until UE can monitor the power saving signaling on those symbol/slot/subframe. In one implementation, the last symbol for the power saving signaling monitoring occasion is the DL symbol located on the nearest symbol to the start of upcoming DRX active time/DRX on-duration time.

2. When the UE is not required to monitor the power saving signaling in a symbol/slot/subframe, the UE may autonomously shift the monitoring occasion for the power saving signaling from the original monitoring occasion to the nearest monitoring occasion located before the starting symbol of the DRX active time/DRX on-duration time. It is noted that if the UE may iteratively determine a new monitoring occasion for the power saving signaling until the UE can monitor the power saving signaling on the monitoring occasion.

3. When the UE is not required to monitor the power saving signaling in a symbol/slot/subframe, the UE may ignore (or skips monitoring) the power saving signaling in the symbol/slot/subframe. More specifically, the UE may need to wake up on the upcoming DRX active time/on duration if the UE ignores (or skip monitoring) the power saving signaling.

If the UE cannot decode/is not required to monitor the power saving signaling, the UE may determine there is no corresponding data scheduled at an upcoming DRX active time/on duration and remain sleeping. Moreover, if the UE cannot decode/is not required to monitor the power saving signaling and the amounts/count of consecutive events (i.e., the UE cannot monitor the power saving signaling) is greater than a threshold, the UE may perform cell selection or automatically be released to inactive/idle state.

In some implementations, the UE may be configured with the measurement gap. During the measurement gap (e.g., in the corresponding time/frequency range of the measurement gap), the UE may or may not perform some DL (e.g., PDCCH monitoring, DL-SCH reception) and/or UL transmission (e.g., transmission of HARQ feedback, SR, CSI, sounding reference signal (SRS) report, UL-SCH transmission).

If the power saving signaling monitoring occasion overlaps the measurement gap, the UE may need to monitor the PDCCH for the power saving signaling (e.g., on the configured power saving signaling monitoring occasion) during the measurement gap. In other words, the measurement gap does not impact the PDCCH monitoring behavior of the power saving signaling.

On the other hand, the UE may not need to monitor the PDCCH for the power saving signaling (e.g., on the configured power saving signaling monitoring occasion) during the measurement gap and the UE may ignore the power saving signaling monitoring occasion during the measurement gap. Thus, the UE may need to wake up on the upcoming DRX active time/DRX on-duration time. In other words, the UE may wake up even if the UE does not receive the power saving signaling during the measurement gap. Alternatively, the UE may not need to wake up on the upcoming DRX active time/DRX on-duration time. In other words, the UE may that consider the power saving signaling is lost (or instructs the UE to sleep) during the measurement gap.

It is noted that the UE may not be required to monitor the power saving signaling in some specific symbols/slots/subframes in at least one of the following situations:

1. If the UE has received ssb-PositionsInBurst in the system information block 1 (SIB1) and has not received ssb-PositionsInBurst in ServingCellConfigCommon for a serving cell and if at least one resource element (RE) for a power saving signaling the overlaps at least one RE corresponding to a SS/physical broadcast channel (PBCH) block index provided by ssb-PositionsInBurst in SIB1, the UE is not required to monitor the power saving signaling.

2. If the UE has received ssb-PositionsInBurst in ServingCellConfigCommon for a serving cell and if at least one RE for a power saving signaling overlaps at least one RE corresponding to a SS/PBCH block index provided by ssb-PositionsInBurst in ServingCellConfigCommon, the UE is not required to monitor the power saving signaling.

3. If at least one RE for the power saving signaling on the serving cell overlaps at least one RE of lte-CRS-ToMatchAround, the UE is not required to monitor the power saving signaling.

4. If at least one RE for the power saving signaling on the serving cell overlaps at least one UL or FL OFDM symbol, the UE is not required to monitor the power saving signaling.

5. If monitoring occasion for the power saving signaling on the serving cell is dropped because the number of monitoring PDCCH candidates or control channel element (CCE) channel estimation exceeds UE capability, the UE is not required to monitor the power saving signaling.

6. If the UE is configured with the measurement gap, e.g., via measGapConfig, on the serving cell, and if at least one RE for the power saving signaling on the serving cell overlaps the time/frequency range of the measurement gap, the UE is not required to monitor the power saving signaling.

Moreover, methods for configuring power saving signaling are disclosed.

1. An IE in search space configuration instructs the UE to monitor the power saving signaling.

2. A new search space type (e.g., power-saving) instructs the UE to monitor the power saving signaling.

3. A new search space type is the combination of the legacy search space type and power saving signaling (e.g., "UE-Specific-and-power-saving-signaling" or "common-and-power-saving-signaling"). For the case of "UE-Specific-and-power-saving-signaling", the UE may determine the PDCCH monitoring occasion for the power saving signaling as UE-specific search space (USS). It is noted that the UE may expect to monitor "DCI format 0_0/0_1" or "DCI format 1_0/1_1" when the UE is in DRX active time/DRX on-duration time, and the UE may expect to monitor "power saving signaling" when the UE is outside DRX active time/DRX on-duration time. For the case of "common-and-power-saving-signaling", the UE may determine the PDCCH monitoring occasion for the power saving signaling as a common search space (CSS). It is noted that the UE may expect to monitor "DCI format 0_0" or "DCI format 1_0" or "DCI format 2_0/2_1/2_2/2_3" when the UE is in DRX active time/DRX on-duration time, and the UE may expect to monitor "power saving signaling" when the UE is outside DRX active time/DRX on-duration time.

4. A new IE of search space configuration indicates whether the search space is also power saving signaling or not.

5. A new DCI format is the combination of the legacy DCI format and power saving signaling (e.g., DCI format 0_0/0_1 and DCI format for PS, DCI format 1_0/1_1 and DCI format for PS, DCI format 2_0 and DCI format for PS, DCI format 0_0/DCI format 1_0 and DCI format for PS, DCI format 2_1 and DCI format for PS, DCI format 2_2 and DCI format for PS, or DCI format 2_3 and DCI format for PS). It is noted that the UE may expect to monitor legacy DCI format when the UE is in DRX active time/DRX on-duration time, and the UE may expect to monitor the power saving signaling when the UE is outside DRX active time/DRX on-duration time.

6. a DCI format for the power saving signaling configuration may include SCell/BWP indexes, and the UE may wake up in DRX active time/DRX on-duration time and monitor PDCCH candidates on the SCell/BWP indicated by the UE-specific power saving signaling.

7. there may be multiple new DCI formats for the power saving signaling configuration. One DCI format is UE-specific DCI format (i.e., DCI format in USS), and the other is group common DCI format (e.g., DCI format 2_0/2_1/2_2). The UE may have different behavior when waking up in DRX active time/DRX on-duration time. For example, if UE-specific power saving signaling includes SCell/BWP indexes, the UE may wake up in DRX active time/DRX on-duration time and monitor PDCCH candidates on the SCell/BWP indicated by the UE-specific power saving signaling. On the other hand, if group common power saving signaling includes only single bits (e.g., T/F, "T" instructs the UE to wake up, and "F" instructs the UE not to wake up), the UE may wake up in DRX active time/DRX on-duration time and monitor PDCCH candidates only on the PCell or on the cell/BWP for receiving power saving signaling.

8. a new DCI format for the power saving signaling configuration may be UE-specific or group-common. The UE may expect to use the first RNTI to de-scramble the DCI format when the UE is outside DRX active time/DRX on-duration time, and the UE may expect to use the second RNTI to de-scramble the DCI format when the UE is in the DRX active time/DRX on-duration time. It is noted that the first RNTI is PS-RNTI, which is different from the second RNTI (e.g., the second RNTI may be a C-RNTI, or a configured scheduling RNTI (CS-RNTI), a modulation and coding scheme RNTI (MCSRNTI), a slot format indication RNTI (SFI-RNTI), an interruption RNTI (INT-RNTI), a transmit power control PUCCH RNTI (TPC-PUCCH-RNTI), a TPC-SRS-RNTI, or a TPC physical uplink shared channel RNTI (TPC-PUSCH-RNTI)).

Figure 5:
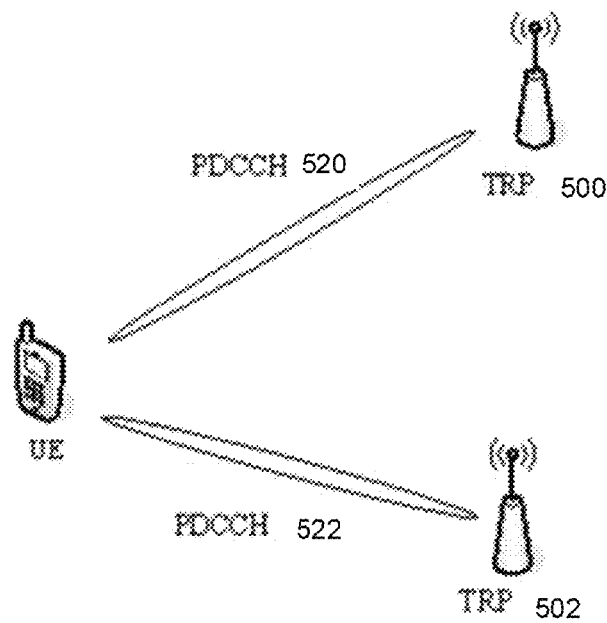
FIG. 5 is a schematic diagram illustrating a multiple transmission and reception point (TRP) system, in accordance with example implementations of the present disclosure.

In one implementation, the UE may monitor the power saving signaling in multiple transmissions and reception point (TRP)/panel scenario. As shown in FIG. 5, the UE may be configured to monitor the power saving signaling from multiple TRPs (e.g., TRP 500 and TRP 502). For example, in FIG. 5, the UE is associated with two TRPs, and the UE may monitor the PDCCH 520 on TRP 500 and PDCCH 522 on TRP 502. If the UE detects power saving signaling indicating the UE to wake up on PDCCH 520 outside DRX active time/DRX on-duration time, but also detects power saving signaling instructing the UE not to wake up on PDCCH 522 outside DRX active time/DRX on-duration time, the UE may not know whether to wake up or not to wake up for monitoring the power saving signal. Hence, the present disclosure further provides solutions for the power saving signaling monitoring in multiple TRPs.

1. The UE may expect to monitor the power saving signaling on only one TRP/one CORESET outside DRX active time/DRX on-duration time. In other words, there may be one or more CORESET configurations including power saving signaling configuration, but the UE only monitors one of them outside DRX active time/DRX on-duration time). In one example, the only one TRP is the primary TRP (e.g., the primary TRP is the first TRP where the UE attaches after an initial access procedure).

2. The power saving signaling transmitted from only one TRP may include TRP information, and the UE may wake up and monitor the PDCCH on DRX active time/DRX on-duration time on the TRP according to the TRP information.

3. The UE may expect to monitor the power saving signaling on all TRPs/all CORESETs outside DRX active time/DRX on-duration time.

4. The UE only expects to wake up and monitor the PDCCH on the TRPs/CORESETs where the UE receives power saving signaling.

5. The UE may expect to monitor the power saving signaling on all TRPs/all CORESETs outside DRX active time/DRX on-duration time. The UE may wake up and monitor the PDCCH in DRX active time/DRX on-duration time if any one of power saving signaling detected outside DRX active time/DRX on-duration time instructs the UE to wake up.

6. The UE may expect to monitor the power saving signaling on all TRPs/all CORESETs outside DRX active time/DRX on-duration time. The UE may wake up and monitor the PDCCH in DRX active time/DRX on-duration time if all power saving signalings detected outside DRX active time/DRX on-duration time instruct the UE to wake up.

It is noted that to support multiple-PDCCH based multi-TRP/panel transmission with intra-cell (e.g., same cell ID) and inter-cell (e.g., different cell IDs), an RRC configuration may be used for associating multiple PDCCH/PDSCH with multiple TRPs. Specifically, one CORESET in a "PDCCH-config" corresponds to one TRP.

It is noted that valid power saving signaling is power saving signaling other than power saving signaling that the UE is not required to monitor in some specific symbol/slot/subframe.

It is noted that the nearest valid power saving signaling monitoring occasion is the power saving signaling monitoring occasion with its occupied OFDM symbol being the nearest to the starting symbol of the DRX active time/DRX on-duration time or has the smallest timing offset from DRX active time/DRX on-duration time among all power saving signals.

It is noted that the nearest valid power saving signaling is determined per TRP/CORESET, and if any nearest valid power saving signaling instructs the UE to wake up, the UE has to wake up and monitor search space (sets) on all the TRPs and CORESETs.

It is noted that if the UE is capable of multiple antenna panels (e.g., the UE is configured with one or more antenna panel ID, or the UE is configured with more than one SRS resource set ID which represents different antenna panels), the UE may only expect to monitor the power saving signaling on the CORESET associated to the active antenna panel outside DRX active time/DRX on Duration. The relationship between the antenna panel and CORESET may be determined by spatial domain information. For example, if the spatial domain information of antenna panel #1 is associated with CSI-RS #1 and the spatial domain information of CORESET #1 is also associated with CSI-RS #1, the UE may determine CORESET #1 is associated with the antenna panel #1.

Figure 6:
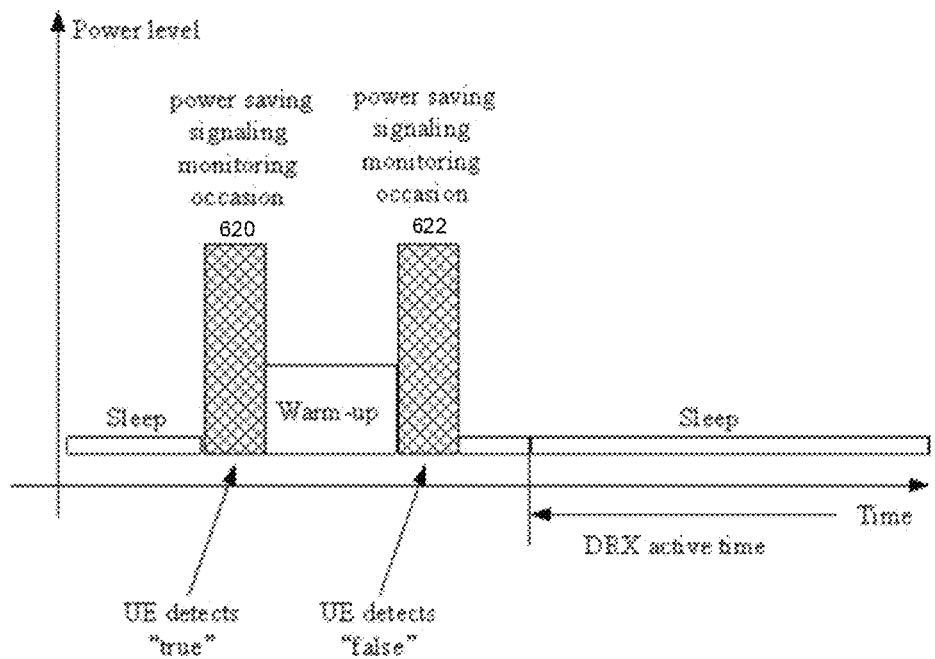
FIG. 6 is a schematic diagram illustrating multiple power saving signaling monitoring occasions, in accordance with example implementations of the present disclosure.

In some implementations, multiple power saving signaling monitoring occasions are outside DRX active time/DRX on-duration time. The UE may detect multiple power saving signals before DRX active time/DRX on-duration time, which may affect the wake-up behavior of the UE in a subsequent DRX active time/DRX on-duration time. For example, the UE may be configured with power saving signaling as a search space (set), and the periodicity of the search space (set) may be 20 ms. Moreover, the UE may be configured with DRX cycle equal to 40 ms. As shown in FIG. 6, PDCCH 620, and PDCCH 622 include power saving signaling are respectively transmitted before DRX active time. If the UE detects power saving signaling which instructs the UE to wake up on PDCCH 620 but the UE also detects power saving signaling which instructs the UE not to wake up on PDCCH 622, the power consumption of the UE may increase due to unnecessary wake-up (of hardware or RF) for the power saving signaling monitoring on PDCCH 620. Hence, the application further provides solutions for the power saving signaling monitoring in multiple power saving signaling monitoring occasions.

1. The UE is only required to monitor the valid power saving signaling on the monitoring occasion located on the symbol which is the nearest symbol to the starting symbol of the DRX active time/DRX on-duration time. In one example, there may be an offset, and the time gap between the nearest valid power saving signaling and the starting symbol of the DRX active time/DRX on-duration time will be larger than the offset. It is noted the time unit of the offset may be a symbol/slot/subframe.

2. It is up to UE's implementation to monitor the power saving signaling outside DRX active time/DRX on-duration time. The UE may determine whether to wake up according to the nearest valid power saving signaling outside DRX active time/DRX on-duration time. In addition, there may be an offset, and the time gap between the nearest valid power saving signaling and the starting symbol of the DRX active time/DRX on-duration time will be greater than the offset. It is noted the time unit of the offset may be a symbol/slot/subframe.

3. The UE may expect to detect only one power saving signaling outside DRX active time/DRX on-duration time. If the UE detects multiple power saving signals outside DRX active time/DRX onDuraiton, the UE may determine it is an error case.

4. The UE may wake up and monitor the PDCCH in DRX active time/DRX on-duration time if any one of power saving signaling detected outside DRX active time/DRX on-duration time instructs the UE to wake up.

5. The UE may wake up and monitor the PDCCH in DRX active time/DRX on-duration time if all power saving signals detected outside DRX active time/DRX on-duration time instructs the UE to wake up.

It is noted that valid power saving signaling is power saving signaling other than power saving signaling that the UE is not required to monitor in some specific symbols/slots/subframes.

Figure 7:
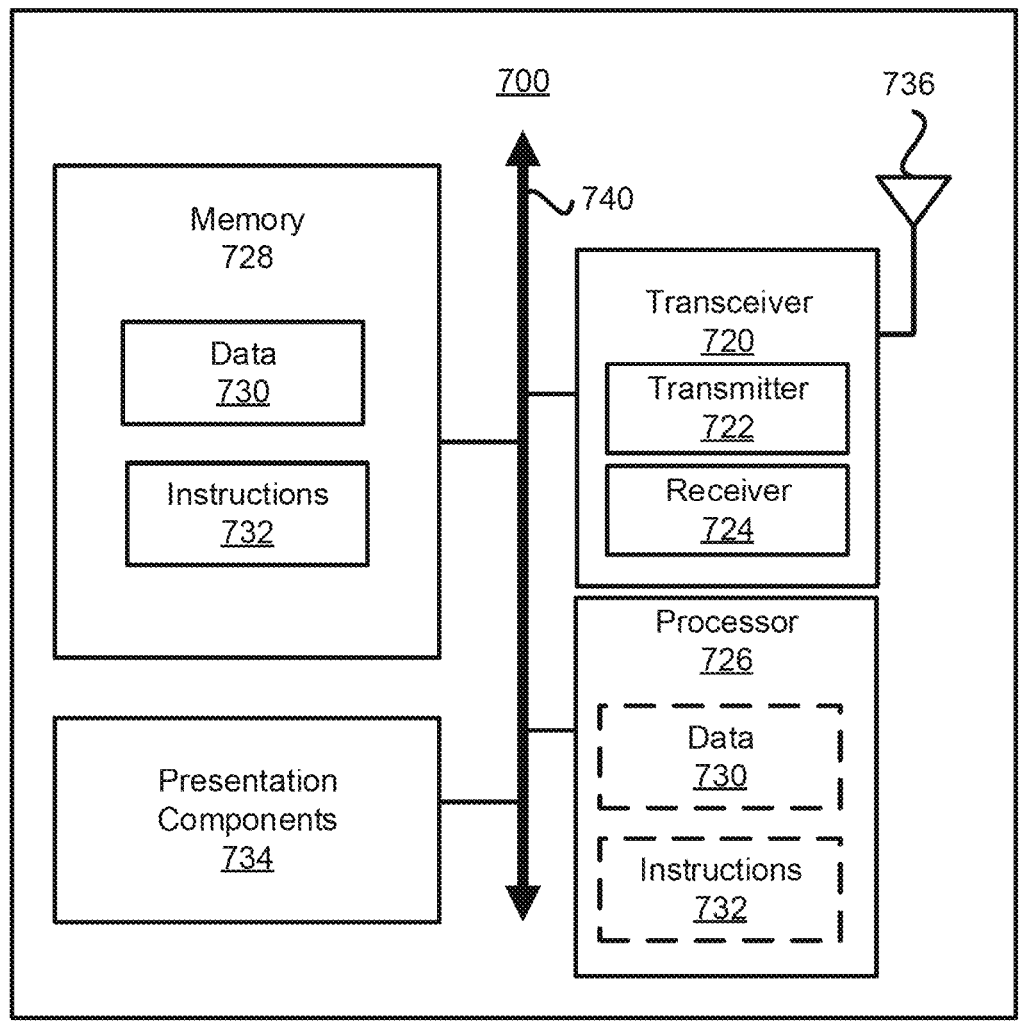
FIG. 7 is a block diagram illustrating a node for wireless communication, in accordance with example implementations of the present disclosure.

FIG. 7 illustrates a node 700 for wireless communication according to the present disclosure.

As illustrated in FIG. 7, the node 700 may include a transceiver 720, a processor 726, memory 728, one or more presentation components 734, and at least one antenna 736. The node 700 may also include a Radio Frequency (RF) spectrum band module, a BS communications module, a network communications module, and a system communications management module, input/output (I/O) ports, I/O components, and a power supply (not shown). Each of these components may be in communication with each other, directly or indirectly, over one or more buses 740. The node 700 may be a UE that performs various disclosed functions as illustrated in FIG. 1.

The transceiver 720 includes a transmitter 722 (with transmitting circuitry) and a receiver 724 (with receiving circuitry) and may be configured to transmit and/or receive time and/or frequency resource partitioning information. The transceiver 720 may be configured to transmit in different types of subframes and slots including, but not limited to, usable, non-usable, and flexibly usable subframes and slot formats. The transceiver 720 may be configured to receive data and control channels.

The node 700 may include a variety of computer-readable media. Computer-readable media may be any media that can be accessed by the node 700 and include both volatile and non-volatile media, removable and non-removable media. Computer-readable media may include computer storage media and communication media. Computer storage media includes both volatile and non-volatile, as well as removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not include a propagated data signal. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. Communication media includes wired media such as a wired network or direct-wired connection, and wireless media such as acoustic, RF, infrared, and other wireless media. Combinations of any of the disclosed media should be included within the scope of computer-readable media.

The memory 728 may include computer-storage media in the form of volatile and/or non-volatile memory. The memory 728 may be removable, non-removable, or a combination thereof. Memory includes solid-state memory, hard drives, and optical-disc drives. As illustrated in FIG. 7, the memory 728 may store computer-readable, computer-executable instructions 732 (e.g., software codes) that are configured to cause the processor 726 (e.g., processing circuitry) to perform various disclosed functions. Alternatively, the instructions 732 may be configured to cause the node 700 (e.g., when compiled and executed) to perform various disclosed functions.

The processor 726 may include an intelligent hardware device (e.g., a central processing unit (CPU), a microcontroller, an ASIC, etc.). The processor 726 may include memory. The processor 726 may process the data 730 and the instructions 732 received from the memory 728, and information received via the transceiver 720, the baseband communications module, and/or the network communications module. The processor 726 may also process information to be sent to the transceiver 720 for transmission via the antenna 736, to the network communications module for transmission to a CN.

One or more presentation components 734 present data to a person or other device. Presentation components 734 include a display device, speaker, printing component, and vibrating component.

From the present disclosure, it is evident that various techniques can be utilized for implementing the concepts of the present disclosure without departing from the scope of those concepts. Moreover, while the concepts have been described with specific reference to certain implementations, a person of ordinary skill in the art would recognize that changes can be made in form and detail without departing from the scope of those concepts. As such, the disclosure is to be considered in all respects as illustrative and not restrictive. It should also be understood that the present disclosure is not limited to the particular described implementations, but that many rearrangements, modifications, and substitutions are possible without departing from the scope of the present disclosure.

What is claimed is:

1. A method for a user equipment (UE) monitoring a physical downlink control channel (PDCCH) for power saving signaling, the method comprising:
    receiving a discontinuous reception (DRX) configuration from a base station (BS) to configure the UE to monitor a scheduling signal on the PDCCH within a DRX active time;
    receiving a power saving signaling configuration from the BS to configure the UE to monitor the power saving signaling on the PDCCH, the power saving signaling configuration comprising a time offset between a start of a nearest power saving signaling and a start of a DRX on-duration time;
    monitoring the PDCCH for the power saving signaling when the time offset is greater than a required time duration;
    waking up to monitor the PDCCH for the scheduling signal in the DRX active time in accordance to the DRX configuration in response to receiving a power saving signaling.

2. The method of claim 1, further comprising reporting the required time to the BS, the required time duration comprising a number of time slots prior to the start of the DRX on-duration time during which the UE is not required to monitor the PDCCH for the power-saving signaling.

3. The method of claim 1, wherein the required time duration is reported to the BS through a UE capability report.

4. The method of claim 1, wherein the DRX active time includes a DRX on-duration timer, a DRX inactivity timer, a DRX retransmission timer, a random access contention resolution timer, a random access response window that is running, a duration for a pending scheduling request that is sent on a Physical Uplink Control Channel (PUCCH), or a duration during which a PDCCH indicating a new transmission addressed to a Cell Radio Network Temporary Identifier (C-RNTI) of a Medium Access Control (MAC) entity has not been received after successful reception of a random access response for a random access preamble not selected by the MAC entity among contention-based random access preambles.

5. The method of claim 1, further comprising not monitoring the PDCCH for the power saving signaling when a first duration of monitoring the power saving signaling overlaps a second duration of a configured measurement gap.

6. The method of claim 5, further comprising waking up to monitor the PDCCH for the scheduling signal in the DRX active time when the UE does not detect the power saving signaling during the measurement gap.

7. The method of claim 1, wherein the DRX on-duration time includes a time while a DRX on-duration timer is running.

8. A user equipment (UE) for monitoring a physical downlink control channel (PDCCH) for power saving signaling, the UE comprising:
  a transceiver;
  a processor, for executing computer-executable instructions; and
  a non-transitory machine-readable medium, coupled to the processor, for storing the computer-executable instructions, wherein the computer-executable instructions instruct the processor to:
    receive, via the transceiver, a discontinuous reception (DRX) configuration from a base station (BS) to configure the UE to monitor a scheduling signal on the PDCCH within a DRX active time;
    receive, via the transceiver, a power saving signaling configuration from the BS to configure the UE to monitor the power saving signaling on the PDCCH, the power saving signaling configuration comprising a time offset between a start of a nearest power saving signaling and a start of a DRX on-duration time;
    monitor the PDCCH for the power saving signaling when the time offset is greater than a required time duration; and
    wake up to monitor the PDCCH for the scheduling signal in the DRX active time in accordance to the DRX configuration in response to receiving a power saving signaling.

9. The UE of claim 8, wherein the computer-executable instructions further instruct the processor to report the required time to the BS via the transceiver, the required time duration comprising a number of slots prior to the start of a DRX on-duration time during which the UE is not required to monitor the PDCCH for the power saving signaling.

10. The UE of claim 8, wherein the computer-executable instructions instruct the processor to report the required time duration to the BS using a UE capability report.

11. The UE of claim 8, wherein the DRX active time includes a DRX on-duration timer, a DRX inactivity timer, a DRX retransmission timer, a random access contention resolution timer, a random access response window that is running, a duration for a pending scheduling request that is sent on a Physical Uplink Control Channel (PUCCH), or a duration during which a PDCCH indicating a new transmission addressed to a Cell Radio Network Temporary Identifier (C-RNTI) of a Medium Access Control (MAC) entity has not been received after successful reception of a random access response for a random access preamble not selected by the MAC entity among contention-based random access preambles.

12. The UE of claim 8, wherein the computer-executable instructions further instruct the processor to not monitor the PDCCH for the power saving signaling when a first duration of monitoring the power saving signaling overlaps a second duration of a configured measurement gap.

13. The UE of claim 12, wherein the computer-executable instructions further instruct the processor to wake up to monitor the PDCCH for the scheduling signal in the DRX active time when the UE does not detect the power saving signaling during the measurement gap.

14. The UE of claim 8, wherein the DRX on-duration time includes a time while a DRX on-duration timer is running.

\* \* \* \* \*